United States Patent [19]

Nishiyama

[11] 4,443,063
[45] Apr. 17, 1984

[54] LIQUID-INJECTION PASSAGE STRUCTURE CONTAINED WITHIN A DISPLAY CELL

[75] Inventor: Mitsuru Nishiyama, Nara, Japan

[73] Assignee: Sharp Kabushiki Kaisha, Osaka, Japan

[21] Appl. No.: 171,294

[22] Filed: Jul. 23, 1980

[30] Foreign Application Priority Data

Jul. 31, 1979 [JP] Japan .................. 54-106400[U]

[51] Int. Cl.³ .............................................. G02F 1/13
[52] U.S. Cl. ........................... 350/334; 350/343; 350/344; 350/357; 313/483
[58] Field of Search ............... 350/334, 343, 344, 357; 340/787, 788; 313/509, 483

[56] References Cited

U.S. PATENT DOCUMENTS

| | | | |
|---|---|---|---|
| 3,771,855 | 11/1973 | Burns | 350/343 |
| 4,037,930 | 7/1977 | Matsuyama et al. | 350/343 |
| 4,039,253 | 8/1977 | Jain | 350/357 |
| 4,213,074 | 7/1980 | Kawaguchi et al. | 313/509 |
| 4,226,509 | 10/1980 | Jacobs | 350/343 |
| 4,357,557 | 11/1982 | Inohara et al. | 313/509 |

FOREIGN PATENT DOCUMENTS 2163043  6/1973  Fed. Rep. of Germany ...... 350/344

*Primary Examiner*—John K. Corbin
*Assistant Examiner*—Richard F. Gallivan
*Attorney, Agent, or Firm*—Birch, Stewart, Kolasch and Birch

[57] ABSTRACT

A display cell comprises two substrates for forming in combination a compartment, an injection hole formed in one of them, a pathway provided for connecting the compartment and the injection hole, and a concavity shaped in at least one of the two substrates. The concavity assures that the pathway has a predetermined width by the depth of the concavity in order that the pathway conducts a liquid to the compartment. Preferably, the depth of the concavity is in the order of about 10 to about 100 μm.

4 Claims, 6 Drawing Figures

LIQUID-INJECTION PASSAGE STRUCTURE CONTAINED WITHIN A DISPLAY CELL

BACKGROUND OF THE INVENTION

The present invention relates to a display cell and, more particularly, to a structure of a liquid-injection passage used for injecting a liquid to complete such a display cell.

The structure of a conventional liquid-injection passage will be explained with reference to FIG. 1. A conventional display cell of FIG. 1 comprises a dish-shaped substrate 1, a compartment 2 inclusive of a liquid, an injection hole 3, a sealing element 4, a flat substrate 5, a pathway 6 for the liquid.

In an arrangement of FIG. 1, it was preferable that a width d of the pathway 6 between the dish-shaped substrate 1 and the flat substrate 5 be limited within about 10 to about 100 $\mu$m. When width d was smaller than about 10 $\mu$m, the amount of the liquid introduced therethrough was insufficient. This was due to a combination of factors including the inability to entirely evacuate the compartment 2, the inability of smoothly conduct the liquid through the pathway 6 due to surface tension of the liquid, and the possibility of stopping the pathway 6 by an alien. When the width d exceeded about 100 $\mu$m, sealing the injection hole 3 by malleable metal was impossible.

Stable adjustment of the width d within proper limitation was very difficult because it was mainly defined by virtue of the thickness of the sealing element 4. The thickness was very difficult to control. It was desired that the width d of the pathway be accurately limited within a desirable range by a simple arrangement of the display cell.

SUMMARY OF THE INVENTION

Accordingly, it is an object of the present invention to provide an improved display cell.

It is another object of the present invention to provide an improved structure of a liquid-injection passage for use in a display cell, the liquid-injection passage functioning to pass a liquid to complete the display cell.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the are from this detailed description.

To achieve the above objects, pursuant to an embodiment of the present invention, a display cell comprises two substrates for forming in combination a compartment, an injection hole formed in one of them, a pathway provided for connecting the compartment and the injection hole, and a concavity shaped in at least one of the two substrates. The concavity assures that the pathway has a predetermined width governed by the depth of the concavity in order that the pathway conducts a liquid to the compartment. Preferably, the depth of the concavity is in the order of about 10 to about 100 $\mu$m.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
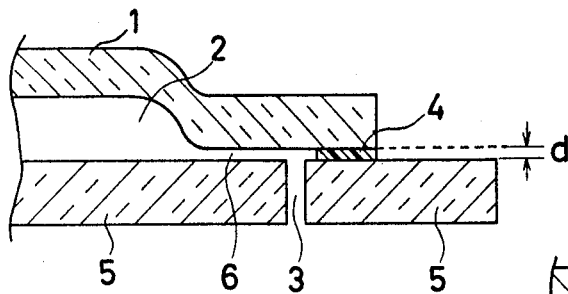
FIG. 1 shows a cross-sectional view of a conventional display cell.

Preliminarily, a display cell of the present invention is directed to any general display cell such as an electrochromic display cell, a liquid crystal cell, an electrophoretic image display cell, and the like.

For the sake of description, the present invention is referred to the electrochromic display cell hereinbelow.

Turning now descriptively to the drawings, in which similar reference characters denote similar elements throughout the several views, FIGS. 2 and 4 to 6 illustrate a cross-sectional view of the electrochromic display cell according to the present invention. A plurality of display electrodes and a counter electrode are omitted from the drawings.

Figure 2:
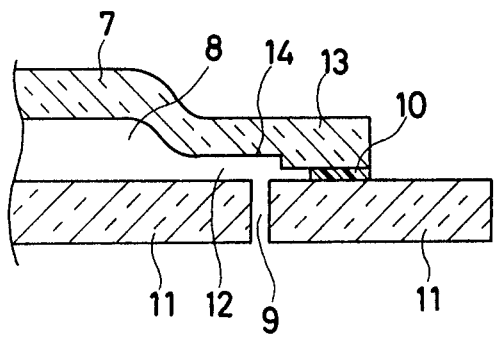
FIGS. 2 and 4 to 6 show a cross-sectional view of a display cell according to the present invention.

With reference to FIG. 2, there are indicated a dish-shaped substrate 7, a compartment 8 inclusive of an electrolyte, an injection hole 9, a sealing element 10, a flat substrate 11, a pathway 12, and a flange portion 13.

At least one of the dish-shaped substrate 7 and the flat substrate 11 is transparent. Each of them is made of a suitable material such as glass. The flange portion 13 is part of the dish-shaped substrate 7.

Within the flange portion 13, a concavity 14 is provided opposite to the injection hole 9. The concavity 14 has a depth of about 10 to about 100 $\mu$m. The concavity 14 forms the pathway 12 together with the flat substrate 11.

Figure 3:
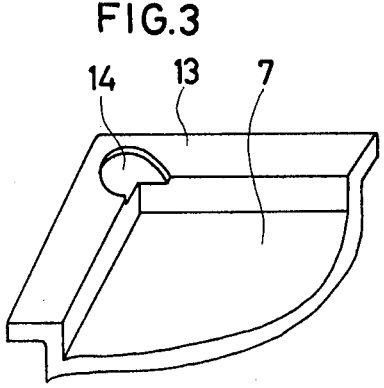
FIG. 3 shows a perspective view of a concavity formed within a dish-shaped substrate of the display cell of FIG. 2.

FIG. 3 shows the concavity 14 formed in the flange portion 13 of the dish-shaped substrate 7.

The display cell is completed by the following procedures:

The dish-shaped substrate 7 is formed by applying tooling to a material which is heated near to its softening point under pressure. Such a tooling made of, say, carbon is modified to provide the concavity 14 as shown in FIGS. 2 and 3. The flange portion 13 is also formed by this procedure. The sealing material 10 is used to bond the flange portion 13 and the flat substrate 11, so that the pathway 12 is eventually formed.

The electrolyte is introduced into the compartment 8 defined by the dish-shaped substrate 7 and the flat substrate 11 by evacuating techniques. Firstly, the compartment 8 is evacuated equal to or less than about 0.1 Torr. The injection hole 9 is then soaked in an electrolyte tank before the display cell is exposed to atomospheric pressure, whereby the electrolyte enters the compartment 8 through the injection hole 8 and the pathway 12. Thereafter, the injection hole 9 is sealed by a malleable metal.

Figure 4:
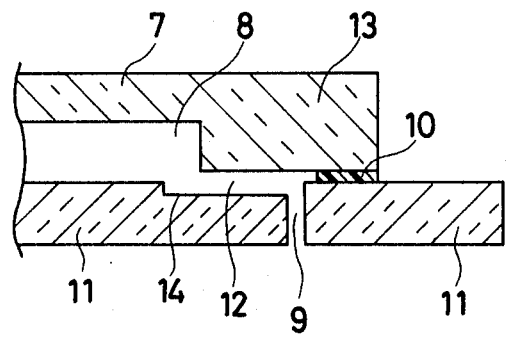
Figure 5:
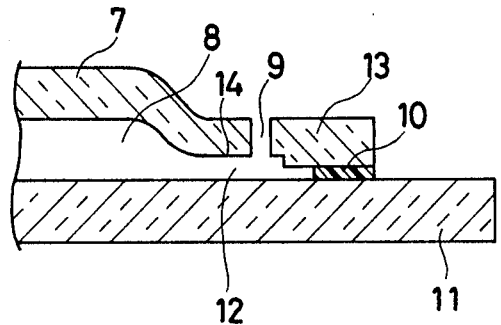
Figure 6:
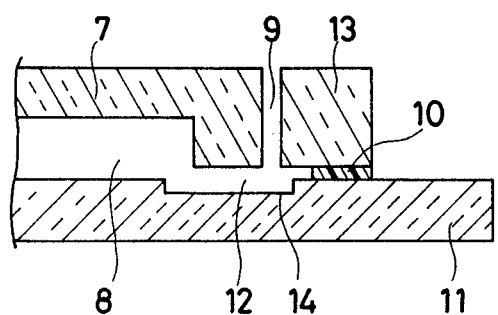

FIGS. 4 to 6 indicate another preferred form of the present invention in a cross-sectional view.

In particular, in FIG. 4, the concavity 14 is formed in the flat substrate 11 to provide the pathway 12 together with the dish-shaped substrate 7. The depth of the concavity 14 is preferably in the order of about 10 to about 100 $\mu$m.

In FIG. 5, the injection hole 9 and the concavity 14 are both formed in the dish-shaped substrate 7. The depth of the concavity 14 is approximately in the same order.

In FIG. 6, the injection hole 9 is formed in the dish-shaped substrate 7 while the concavity 14 is formed in the flat substrate 11. The depth of the concavity 14 is approximately in the same order.

As stated above, according to the present invention, the pathway 12 connecting the injection hole 9 is formed with the help of the concavity 14 shaped in one of the substrates 7 and 11. The concavity 14 assures that the pathway 12 has a width suitable for conducting the electrolyte therein.

Although not shown, the concavity 14 can be formed in both the flat substrate 11 and the dish-shaped substrate 7 to provide the pathway 12. In such a case, it may be possible that the concavity 14 shaped in each of the substrates has a depth of about 5 to about 50 μm.

The invention being thus described, it will be obvious that the same may be varied in many ways. Such variation are not to be regarded as a departure from the spirit and scope of the invention, and all such modifications are intended to be included within the scope of the following claims.

What is claimed is:

1. A display cell comprising:

first and second substrate means in an opposing spacial relationship one to the other forming in combination a compartment for containing a liquid, said first and second substrate means having an electrode means thereon for providing a visual display, said compartment being reduced in depth at the periphery of said spacial relationship to form a pathway for said liquid, said pathway comprising a concavity formed in at least one of said first and second substrate means at said periphery, said concavity comprising an integral part of said pathway;

an injection hole formed in the periphery of at least one of said first and second substrate means opposite said concavity for introducing said liquid into said pathway; and a sealing space provided at said periphery of said first and second substrate means lateral to said pathway for receiving a sealing material, said space having a depth less than that of said pathway such that said pathway has an established depth greater than the depth of said sealing space by the amount of said concavity such that said pathway freely conducts said liquid to said compartment.

2. The display cell as set forth in claim 1, wherein said depth of said concavity is in the order of about 10 to about 100 μm.

3. The display cell as set forth in claim 1, wherein at least one of said first and second substrate means is shaped like a dish.

4. The display cell of claim 1, further including an electrolyte in said compartment and a malleable metal for filling and sealing said injection hole.

* * * * *